(12) United States Patent
Hua et al.

(10) Patent No.: US 10,634,295 B2
(45) Date of Patent: Apr. 28, 2020

(54) LED LIGHT SOURCE MODULE AND METHOD FOR LIGHT IRRADIATION THEREOF

(71) Applicant: Industrial Technology Research Institute, Hsin-Chu (TW)

(72) Inventors: Shih-Hao Hua, Changhua County (TW); Chao-Pin Chen, Changhua County (TW); Te-Yu Chien, Kaohsiung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 55 days.

(21) Appl. No.: 15/692,042

(22) Filed: Aug. 31, 2017

(65) Prior Publication Data
US 2018/0356053 A1 Dec. 13, 2018

(30) Foreign Application Priority Data

Jun. 13, 2017 (TW) .............................. 106119691 A

(51) Int. Cl.
*F21K 9/68* (2016.01)
*F21K 9/60* (2016.01)
(Continued)

(52) U.S. Cl.
CPC .............. *F21S 2/005* (2013.01); *A01G 7/045* (2013.01); *F21K 9/23* (2016.08); *F21K 9/237* (2016.08);
(Continued)

(58) Field of Classification Search
CPC ...... F21V 7/0025; F21V 7/0083; F21V 7/048; F21V 3/02; F21V 31/00; F21V 31/005;
(Continued)

(56) References Cited

U.S. PATENT DOCUMENTS

| | | | |
|---|---|---|---|
| 4,143,412 | A | 3/1979 | Sassmannshausen |
| 6,921,182 | B2 | 7/2005 | Anderson, Jr. et al. |

(Continued)

FOREIGN PATENT DOCUMENTS

| | | |
|---|---|---|
| CN | 1721758 A | 1/2006 |
| CN | 101566310 A | 10/2009 |

(Continued)

OTHER PUBLICATIONS

Taiwan Intellectual Property Office, "Office Action" dated Oct. 27, 2017, Taiwan.
CN OA dated Oct. 12, 2019.

*Primary Examiner* — Suezu Ellis
(74) *Attorney, Agent, or Firm* — WPAT, PC

(57) ABSTRACT

An LED light source module includes a LED board, an optical reflector, a water-proof cover and a lamp pole. The optical reflector furnished above the LED board has a plurality of optical reflecting surfaces that are corresponding to those LED light sources making them irradiate upward. The waterproof cover, being in bowl shape, has its open end which is connected to the LED board. The optical reflector is furnished between the waterproof cover and the LED board. The lamp pole, being in hollow shape, has a power supply furnished therein. Both ends of the lamp pole are connected to the LED board and the power supply socket respectively.

8 Claims, 14 Drawing Sheets

(51) Int. Cl.

| | | |
|---|---|---|
| *F21K 9/23* | (2016.01) | |
| *F21K 9/237* | (2016.01) | |
| *F21V 31/00* | (2006.01) | |
| *F21V 7/04* | (2006.01) | |
| *F21S 2/00* | (2016.01) | |
| *F21V 15/01* | (2006.01) | |
| *A01G 7/04* | (2006.01) | |
| *F21V 7/00* | (2006.01) | |
| *F21Y 115/10* | (2016.01) | |
| *F21Y 103/33* | (2016.01) | |

(52) U.S. Cl.
CPC ............... *F21K 9/60* (2016.08); *F21K 9/68* (2016.08); *F21V 7/0016* (2013.01); *F21V 15/01* (2013.01); *F21V 31/00* (2013.01); *F21Y 2103/33* (2016.08); *F21Y 2115/10* (2016.08)

(58) Field of Classification Search
CPC ..... F21V 7/04; F21V 7/09; F21K 9/66; F21K 9/68
See application file for complete search history.

(56) References Cited

U.S. PATENT DOCUMENTS

| | | | |
|---|---|---|---|
| 7,709,811 B2 | 5/2010 | Conner | |
| 8,033,683 B2 | 10/2011 | Fields | |
| 8,714,774 B2 | 5/2014 | Dubuc | |
| 2006/0291209 A1 | 12/2006 | Booth et al. | |
| 2007/0101645 A1 | 5/2007 | Christopher et al. | |
| 2009/0097268 A1 | 4/2009 | Mochizuki | |
| 2012/0134133 A1* | 5/2012 | Kang | F21V 3/00 362/84 |
| 2012/0161170 A1 | 6/2012 | Dubuc et al. | |
| 2012/0293057 A1* | 11/2012 | Yamamoto | F21V 29/004 313/45 |
| 2013/0235582 A1* | 9/2013 | Breidenassel | F21V 7/04 362/241 |

FOREIGN PATENT DOCUMENTS

| | | |
|---|---|---|
| CN | 202091827 U | 12/2011 |
| CN | 202274361 U | 6/2012 |
| CN | 203718409 U | 7/2014 |
| CN | 104100923 A | 10/2014 |
| CN | 203907334 U | 10/2014 |
| CN | 104180206 A | 12/2014 |
| CN | 104322297 A | 2/2015 |
| CN | 104976555 | 10/2015 |
| TW | 200844362 | 11/2008 |
| TW | M448128 | 3/2013 |
| TW | 201339502 A | 10/2013 |
| TW | M463862 | 10/2013 |
| TW | M471140 | 2/2014 |
| TW | 201542972 | 11/2015 |
| TW | M521142 | 5/2016 |

* cited by examiner

LED LIGHT SOURCE MODULE AND METHOD FOR LIGHT IRRADIATION THEREOF

CROSS REFERENCE TO RELATED APPLICATION

This application also claims priority to Taiwan Patent Application No. 106119691 filed in the Taiwan Patent Office on Jun. 13, 2017, the entire content of which is incorporated herein by reference.

1. FIELD OF THE DISCLOSURE

The disclosure relates to an LED light source module, and more particularly, to a wide-angle type of LED light source module. The disclosure also relates to a method for light irradiation thereof.

2. DESCRIPTION OF THE PRIOR ART

When it comes to winter, rattan creeping vines (such as grapes, etc.) often face the problem of shorting of sunshine. In order to improve the problem, the fruit growers usually set up plant-growth lighting lamp like fluorescent lamp (CFL) in the orchard to complement the lighting, so that the scaffolding on the foliage can have sufficient lighting.

However, since the CFL of the prior art is low in luminous efficiency and high in power consumption, and while a large number of CFLs are employed in the orchard by the fruit farmer, the cost in the orchard is greatly increased.

In addition, the light irradiated by the CFL of the prior art is irradiated in all directions without directivity (sense property). As result, about 50% of the light irradiated by the CFL will be irradiated towards the ground, causing the rattan creeping vines creeping around on the scaffolding unable to effectively utilize the light irradiated by the CFL.

What is more, since the spectrum of the CFL (550 nm and 630 nm) of the prior art is not completely the same as the spectrum of (46 nm and 660 nm) plant photosynthesis, the energy produced by the CFL can not be sufficiently absorbed by the plant.

In addition, since the CFL of the prior art does not possess the waterproof function, the vapor is apt to permeate into the CFL causing fault or damage, thereby it is not applicable for use in the open space net room and the greenhouse.

Therefore, just how to present a light source module that can effectively improve the various shortcomings of the CFL of the prior art has become an urgent subject.

SUMMARY OF THE DISCLOSURE

In light of the disadvantages of the prior arts, the disclosure provides an LED light source module and the light irradiation method thereof to resolve various existing problems of the CFL of the prior art that aims to ameliorate at least some of the disadvantages of the prior art or to provide a useful alternative.

According to one of the objectives of the disclosure, an LED light source module is presented. The LED light source module includes a LED board, an optical reflector, a waterproof cover and a lamp pole. The LED board is furnished with a plurality of LED light sources. The optical reflector, being furnished above the LED board, has a plurality of optical reflecting surfaces that are corresponding to those LED light sources making them irradiate upward. The waterproof cover, being in bowl-shape, has the open end thereof connect to the LED board; the optical reflector is furnished between the waterproof cover and the LED board. The lamp pole, being in hollow-shape, has a power supply furnished therein; both ends of the lamp pole are connected to the LED board and the power supply socket respectively.

Moreover, according to one of the objectives of the disclosure, another LED light source module is also presented. The LED light source module includes a LED board, an optical reflector, a waterproof cover and a lamp pole. The LED board is furnished with a plurality of LED light sources, and the LED of the LED board is facing downward. The optical reflector, being furnished below the LED board, has a plurality of optical reflecting surfaces that are corresponding to those LED light sources making them irradiate downward. The waterproof cover, being in bowl-shape, has the open end thereof connect to the LED board; the optical reflector is furnished between the waterproof cover and the LED board. The lamp pole, being in hollow-shape, has a power supply furnished therein, and both ends of the lamp pole are connected to the LED board and the power supply socket respectively.

What is more, according to another objective of the disclosure, a light irradiation method is also presented. The method includes the following steps: providing a plurality of LED light sources; providing optical reflector and having the plurality of optical reflecting surfaces thereof correspond to those LED light sources; making the light irradiated from the LED light sources reflect by the corresponding optical reflection surfaces.

According to the above-described statements, the LED light source module and method for light irradiation thereof of the disclosure possesses at least the following advantages:

(1) In an embodiment of the disclosure, since the LED light source module of the disclosure employs the LED light source, the luminous efficiency is high and the power consumption is low, thereby the fruit growers need only a smaller number of the LED light source module to achieve the desired efficacy.

(2) In an embodiment of the disclosure, the optical reflector, possessed by the LED light source module of the disclosure, is capable of reflecting the light irradiated by the LED light source module making it possess directivity (sense property), thereby the plant can effectively utilize the light irradiated by the LED light source module.

(3) In an embodiment of the disclosure, the LED light source module has an optical reflector that includes a plurality of optical reflection surfaces corresponding to the LED light sources of the LED light source module, thereby the light beam angle of the LED light source module can be extended, and the efficacy and the light illumination uniformity in short distance of the LED light source module can be enhanced.

(4) In an embodiment of the disclosure, the LED light source of the LED light source module has a special light disposing ratio design which makes it more compatible with the spectrum of plant photosynthesis, thereby the energy generated by the LED light source module can be sufficiently absorbed by the plant.

(5) In an embodiment of the disclosure, the LED light source module has a special waterproof design, so that the vapor or rain is not apt to permeate into the LED light source module, thereby it can greatly reduce the faulty rate of the LED light source module and increase the service life of the LED light source module, thereby, it is applicable in the open space net room and greenhouse.

(6) In an embodiment of the disclosure, the LED light source module, having special structural design, is applicable to an orchard using a scaffolding. It is also applicable to orchard with plants growing on the ground. In addition, it is also applicable to other occasion where the range of light beam irradiation is required to increase. Therefore, it is more flexible when it comes to use.

BRIEF DESCRIPTION OF THE DRAWINGS

The accomplishment of this and other objects of the disclosure will become apparent from the following description and its accompanying drawings of which.

DETAILED DESCRIPTION OF THE PREFERRED EMBODIMENT

Figure 1:
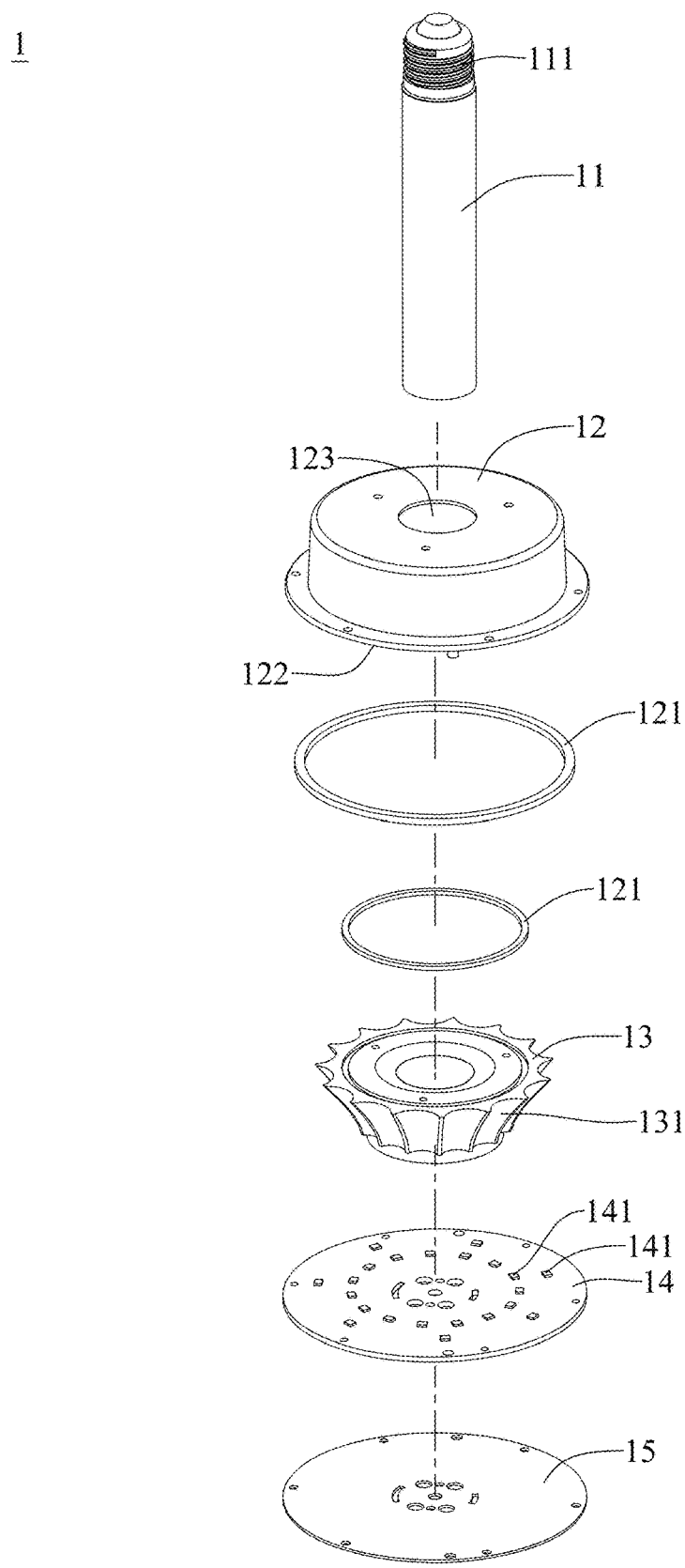
FIG. 1 is an exploded view of a first embodiment of the LED light source module of the disclosure.

The following descriptions are embodiments of the disclosure employing some particular concrete examples. Those people skilled in the art are capable of easily realizing the advantages and efficacies of the disclosure through the content disclosed by the patent specification of the disclosure.

Hereinafter, the embodiments of the LED light source module and the light irradiation method according to the disclosure will be described with reference to the related drawings, and the components in the drawings may be exaggerated in size and scale for the sake of clarity and convenience of illustration.

In the following description and/or in the "What is claimed is", when it comes to an element that "is connected or coupled" to another element, it may be directly connected or coupled to the other element or there may be intervening elements; when it comes to an element "is directly connected to" or "directly coupled to" another element, there are no intervening elements while other terms used to describe the relationship between elements or layers should be interpreted in the same way. To facilitate understanding, same elements in the following examples are denoted by the same reference numerals.

Figure 2:
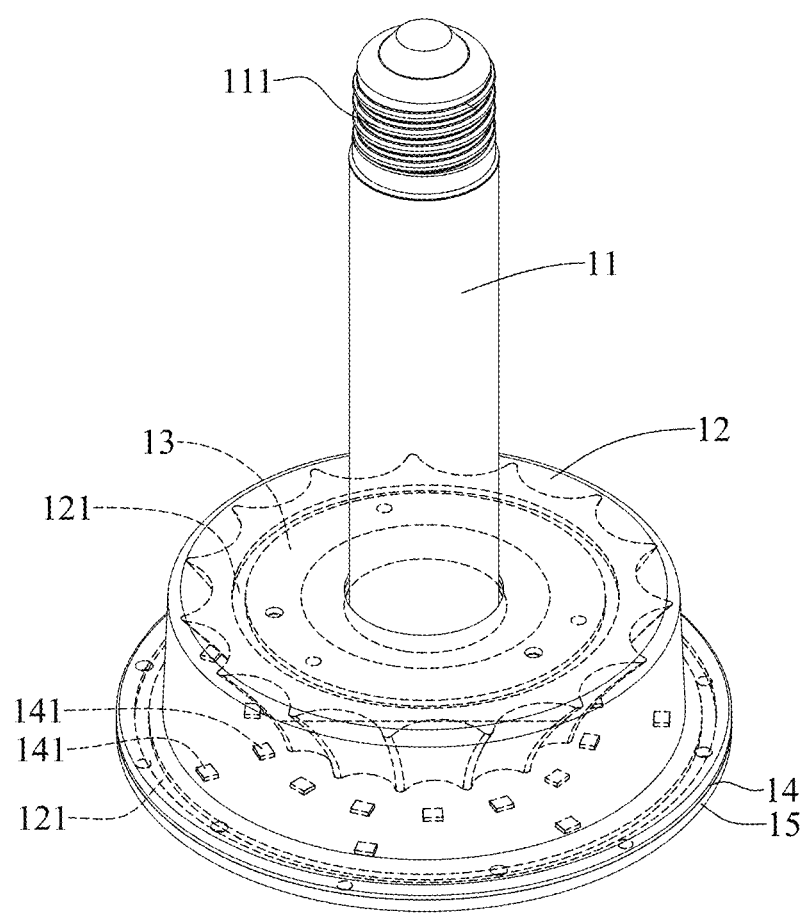
FIG. 2 is an outward appearance after the components are combined of the first embodiment of the LED light source module of the disclosure.

FIG. 1 is an exploded view of a first embodiment of the LED light source module of the disclosure and FIG. 2 is an outward appearance after the components are combined of the first embodiment of the LED light source module of the disclosure. As shown in FIG. 1, and FIG. 2, the LED light source module (1) includes a lamp pole (11), a waterproof cover (12), an optical reflector (13), a LED board (14) and a heat-dissipating base (15).

As shown in FIG. 1, the LED board (14) which can be a print circuit board (PCB) has a plurality of LED light sources (141) furnished thereof. These LED light sources (141) were encapsulated LED chips, can be arranged concentrically along the inner and outer circles respectively in the present embodiment, and can also be arranged concentrically in the other embodiment.

In order to prolong the service life of the LED light source (141) and lower the situation that the LED light source (141) might burnout earlier than expected, the heat-dissipating base (15) can be furnished below the LED board (14), on which the LED light sources (141) are attached, and connected thereto to dissipate the heat transferred from the LED light sources (141) to the LED board (14). The heat-dissipating base (15) is made by metals, such as aluminum, copper, iron or stainless plate.

The optical reflector (13), being furnished above the LED board (14), can have a plurality of optical reflecting surfaces (131) and each of which can be a groove with a curvy surface and can correspond to at least one LED light source (141). These LED light sources (141) are irradiated from the bottom to the top, and are reflected upward by the optical reflecting surfaces (131).

The waterproof cover (12), being in a bowl shape, includes an open end (122) and a through hole (123). The open end (122) of the waterproof cover (12) is connected to the LED board (14). The optical reflector (13) is furnished between the waterproof cover (12) and the LED board (14).

The lamp pole (11), being in hollow shape, can have a power supply furnished therein (not shown in the Figure), and one end of the lamp pole (11) can pass through the through hole (123) of the waterproof cover (12) and the groove of the optical reflector (13) to be connected to the LED board (14), while the other end of the lamp pole (11) can contain a lamp head (111) which can be connected to a power supply socket (not shown in the Figure) to drive the those LED light sources (141).

The waterproof cover (12) includes a plurality of waterproof rubber strips (121) to enhance the waterproof effect of the LED light source module (1). In the present embodiment, the waterproof strips (121) (O-ring) can be furnished between the optical reflector (13) and the waterproof cover (12) respectively, as well as the connecting portion of the open end (122) of the waterproof cover (12) and the LED board (14), thereby enhancing the waterproofing effect of the LED light source module (1).

In addition, in the present embodiment, the distribution ratio of the white light to the red light of the LED light source (141) is 1:1 to 1:4, and the specific light pattern is designed so that the spectrum of the light irradiated from the LED light source module (1) can meet the photosynthesis spectrum of the plant, so the energy generated by LED light source module (1) can be absorbed sufficiently by the plant.

It is known from the above description that the LED light source module (1) of the present embodiment employs the LED light source (141) so that the light irradiation efficiency is high and the power consumption is low. Furthermore, the fact that the LED light source module (1) of the present embodiment possesses special structure design makes the irradiated ray of light has directivity (sense property).

Figure 3A:
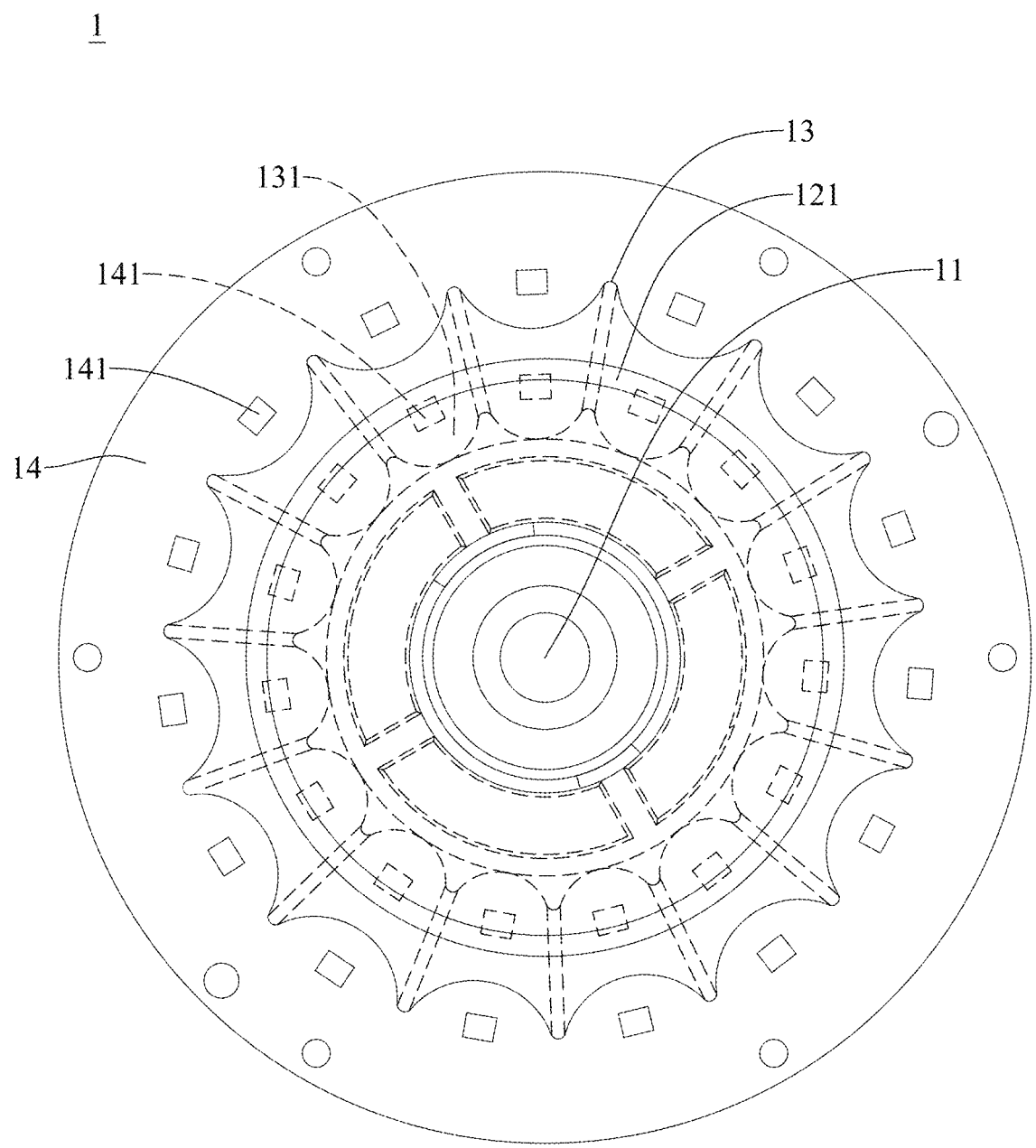
FIG. 3A is a top view of the first embodiment of the LED light source module of the disclosure.
Figure 3B:
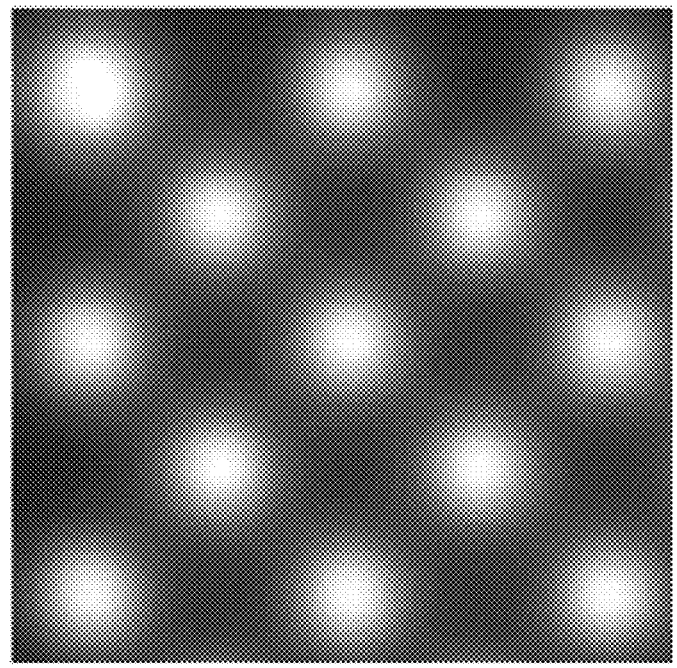
FIG. 3B to 3C are light illumination distribution patterns of the first embodiment of the LED light source module of the disclosure.
Figure 3C:
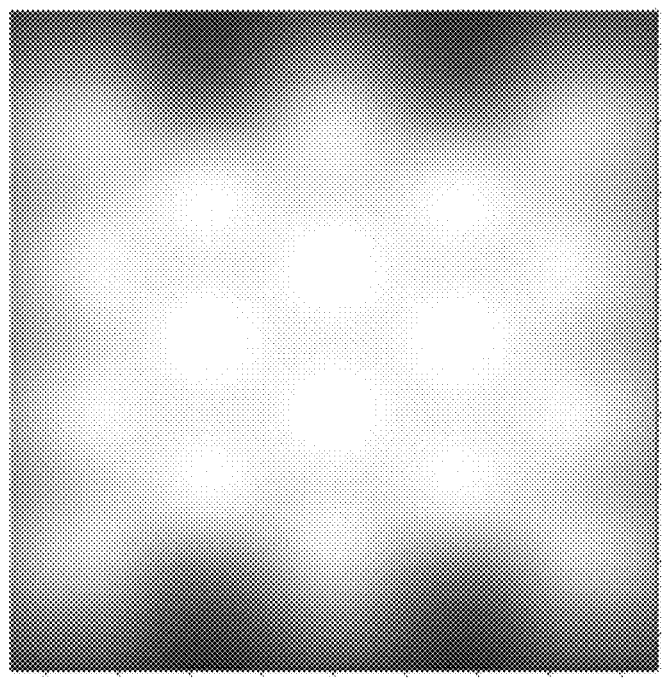

FIG. 3A is a top view of the first embodiment of the LED light source module of the disclosure while FIG. 3B to 3C are light illumination distribution patterns of the first embodiment of the LED light source module of the disclosure. As shown in FIG. 3A, the LED light sources (141) of the LED light source module (1) of the present embodiment are furnished on the inner and outer circles respectively, wherein the ratio of the number of the LED light sources (141) furnished along the inner circle and the number of the LED light source (141) along the outer circle may be 2:1 to 3:1, so that the LED light source module (1) can have a better light illuminating uniformity.

FIG. 3B is the light illumination distribution patterns of the LED light source module (1) wherein both the number of LED light source (141) furnished along the inner and outer circles respectively is 15, that is, the ratio of the number LED light source (141) furnished along the inner and outer circles respectively is 1:1. as shown in FIG. 3B, if the number of LED light source (141) furnished along the inner and outer circles respectively possesses the above-described ratio, the illumination right above the LED light source module (1) is too strong such that the illuminations among the LED light sources (141) are not uniform resulting in that the bright-and-dark zone is excessively significant.

FIG. 3C is the light illumination distribution patterns of the LED light source module (1) wherein the ratio of the number LED light source (141) furnished along the inner and outer circles respectively is 2:1 to 3:1. As shown in FIG. 3C, if the number of LED light source (141) furnished along the inner and outer circles respectively possesses the above-described ratio, the illumination right above the LED light source module (1) is weaker than that of the FIG. 3b such that the LED light source module (1) can achieve a better uniformity on light illumination.

It is known from the above-described illustration that to have the ratio of the number LED light source (141) furnished along the inner and outer circles respectively is 2:1 to 3:1 of the LED light source module (1) of the present embodiment is certainly capable of achieving the efficacy of better uniformity on light illumination.

Figure 4A:
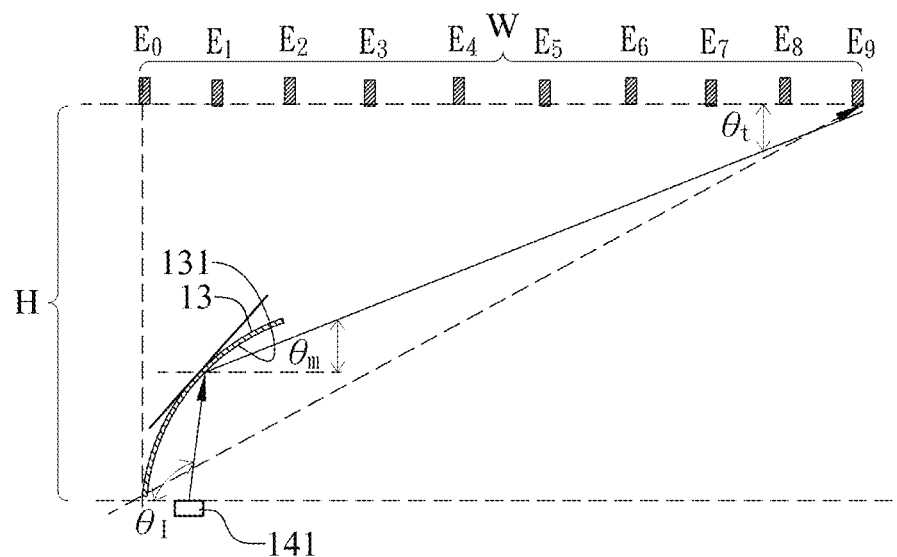
FIG. 4A to 4C are schematic views showing the curvature design of the first embodiment of the LED light source module of the disclosure.

FIG. 4A is a schematic view showing the curvature design of the first embodiment of the LED-light source module of the disclosure. As shown in FIG. 4A, in the present embodiment, the range of irradiation W of the irradiation surface is divided into 10 equal parts denoted by E0~E9 as measuring points, and their light intensity parameters are calculated respectively, wherein the irradiation distance H is 60 cm and the range of irradiation W is 200 cm; $\theta_1$ denotes light irradiation angle (incident angle), $\theta_1$ denotes light reflective angle, $\theta_m$ denotes the curvature of the optical reflecting surfaces (131); the formula (1) of the light reflective angle $\theta_1$ is shown below:

$$\theta_1 = \tan^{-1}(H/W) \quad (1)$$

and the curvature $\theta_m$ of the optical reflecting surfaces (131) can be calculated by the formula (2) shown below:

$$\theta_m = (\theta_1 + \theta_1/2 + (90° - \theta_1)) \quad (2)$$

In the present embodiment, each of the irradiation points and the curvature of the reflection surfaces are calculated according to formula (2) shown above, and continuous curve surfaces are formed by connecting these irradiation points to make the light capable of uniformly irradiating on the pre-determined illumination surfaces.

Figure 4B:
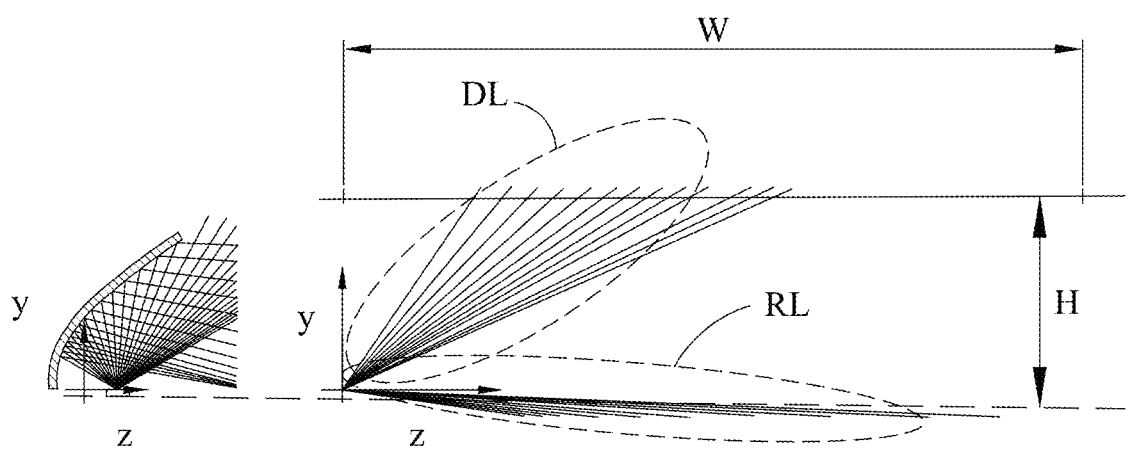

FIG. 4B is a schematic view showing the curvature design of the first embodiment of the LED-light source module of the disclosure. The curvature of the optical reflecting surfaces (131) can affect the range of irradiation of the LED light source (141); The direct irradiating light (DL) and the reflecting light (RL) as shown in FIG. 4B, if the curvature of the optical reflecting surfaces (131) is too large, the reflecting light (RL) will irradiate downward to the ground, thereby, the range of irradiation will be much smaller than W (200 cm).

Figure 4C:
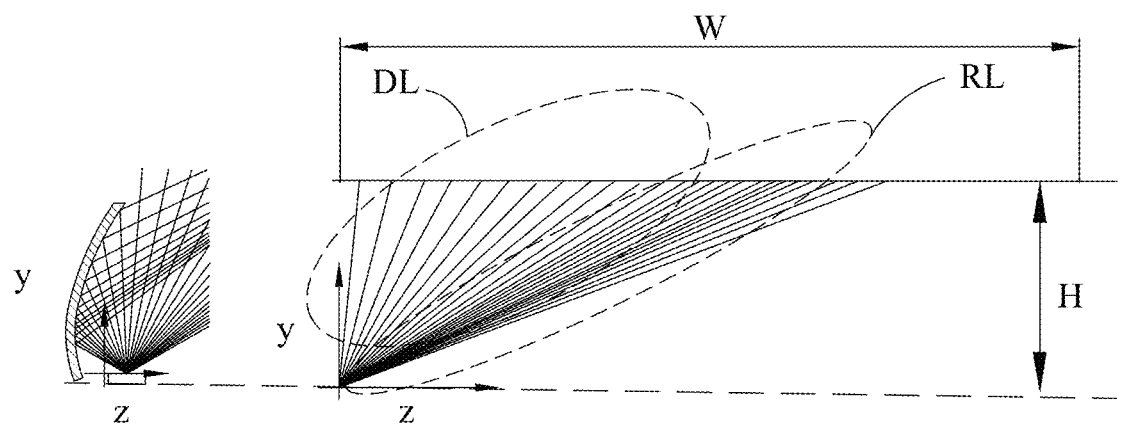

FIG. 4C is a schematic view showing the curvature design of the first embodiment of the LED-light source module of the disclosure. As shown in FIG. 4C, if the curvature of the optical reflecting surfaces (131) is too small, the reflecting light (RL) will irradiate upward and very close to the direct irradiating light (DL), thereby, the range of irradiation will be much smaller than W(200 cm).

Figure 4D:
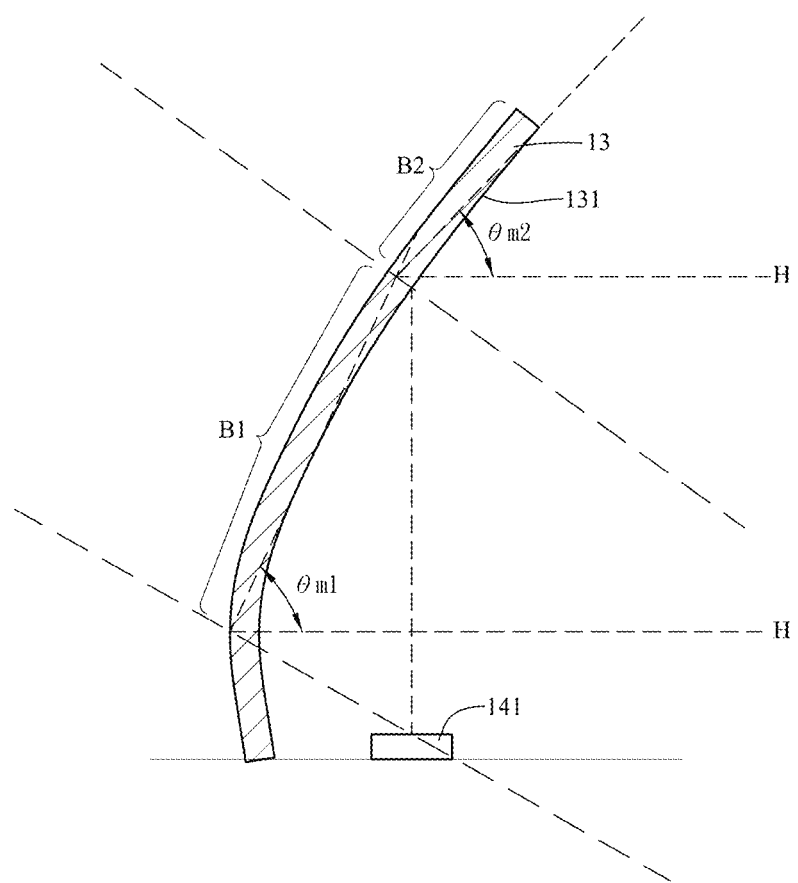
FIG. 4D~4H are schematic views of the irradiation angle of the LED light source according to the first embodiment of the LED light source module of the disclosure.

FIG. 4D is a schematic view of the irradiation angle of the LED light source according to the first embodiment of the LED light source module of the disclosure. As shown in FIG. 4D, by employing the position that is directly above the center of the inner circle LED light source (141) as the dividing border, the curvature of the optical reflecting surfaces (131) can be divided into two blocks that include a first block (B1) and a second block (B2) wherein the included angle between the first block (B1) and the horizontal plane is $\theta_{m1}$ while the included angle between the second block (B2) and the horizontal plane is $\theta_{m2}$.

Figure 4E:
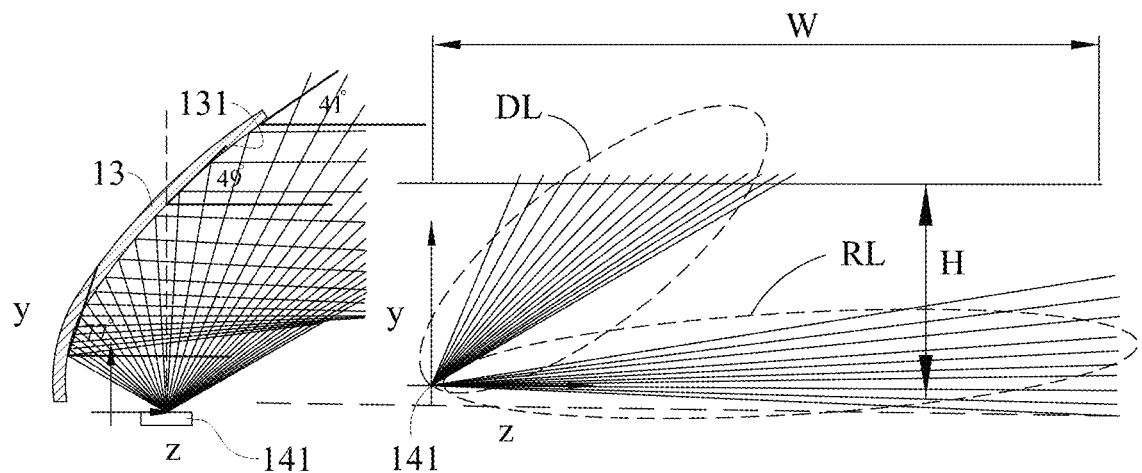

FIG. 4E is a schematic view of the irradiation angle of the LED light source according to the first embodiment of the LED light source module of the disclosure. As shown in FIG. 4E, when the range of $\theta_{m1}$ is $49° < \theta_{m1} < 77°$ and the range of $\theta_{m2}$ is $41° < \theta_{m2} < 49°$, the reflecting light (RL) is irradiated in the horizontal direction.

Figure 4F:
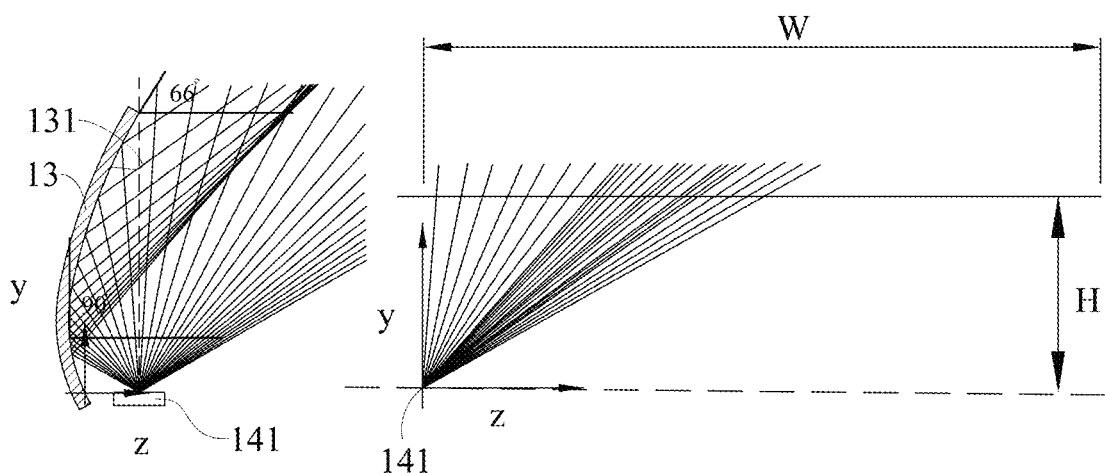

FIG. 4F is a schematic view of the irradiation angle of the LED light source according to the first embodiment of the LED light source module of the disclosure. As shown in FIG. 4F, when the range of $\theta_{m1}$ is $\theta_{m1} = 90°$, and $\theta_{m2} > 66°$, the reflecting light (RL) will be overlapped with the direct light (DL), and the irradiation distance can not be effectively elevated and the diffusion effect can not be achieved. In addition, the light of the irradiated right half part of the LED light source (141) is almost totally the direct light that is not reflected through the optical reflecting surfaces (131).

Figure 4G:
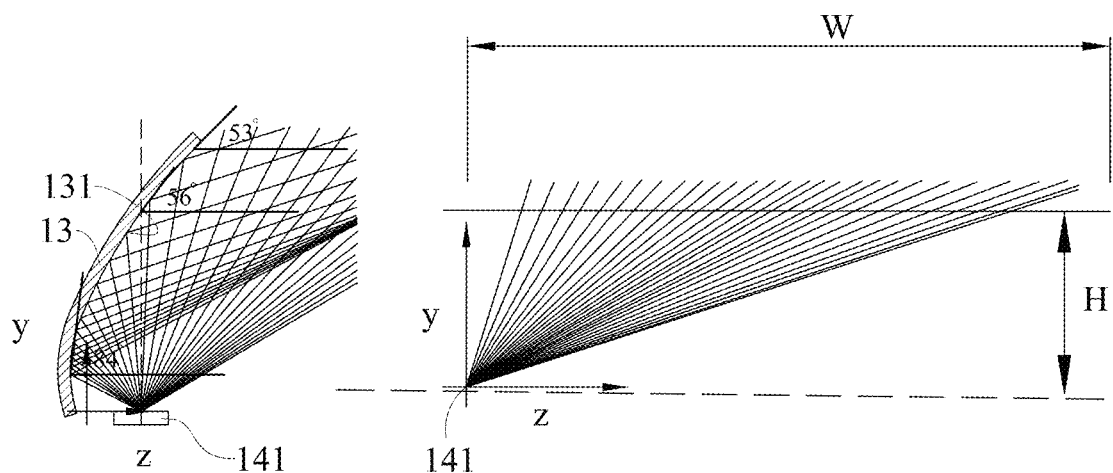

FIG. 4G is a schematic view of the irradiation angle of the LED light source according to the first embodiment of the LED-light source module of the disclosure. As shown in FIG. 4G, the range of $\theta_{m1}$ is $56° < \theta_{m1} < 84°$ while the range of $\theta_{m2}$ is $53° < \theta_{m2} < 56°$ through the above-described curvature design, the reflecting light (RL) will irradiate to the 100 cm-200 cm position, and will not be overlapped with the direct light (DL). What is more, the light, that has relatively stronger energy, irradiated by the left-half portion above the LED light source (141) is also capable of reflecting to the far position through the optical reflecting surfaces (131).

Figure 4H:
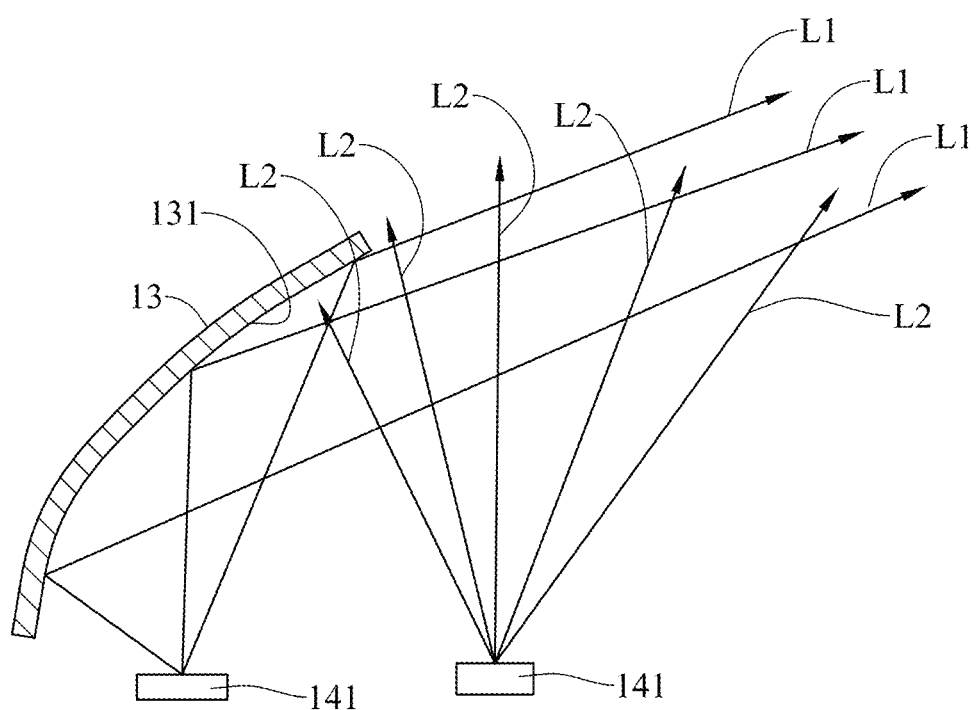

FIG. 4H is a schematic view of the irradiation angle of the LED light source according to the first embodiment of the LED-light source module of the disclosure. As shown in FIG. 4H, through the above-described mechanism design, the reflecting light (RL) reflected by the optical reflecting surfaces (131), being not to be overlapped with the direct light (DL) irradiated by the LED light source (141) at the outer circle, can lower the light in the horizontal direction to the minimum amount.

Also shown in the FIG. 4H, the ray of light L1 irradiated from the LED light source (141) furnished at the inner circle can be obliquely irradiated upward at an angle by reflection and the light beam angle can be increased from 120° to 160° through the optical reflecting surfaces (131). Moreover, a portion of the light L2 irradiated from those LED light sources (141) positioned at the outer circle can be irradiated directly toward the area above the LED light source module (1), while another portion can be reflected through the optical reflecting surfaces (131) making the illumination in the space above the LED light source module (1) be effectively elevated and achieve the objective of optimized light illumination uniformity. Therefore, the above-described structure can further enhance the light beam angle, the efficiency and the light illumination uniformity of the LED light source module (1).

Figure 5A:
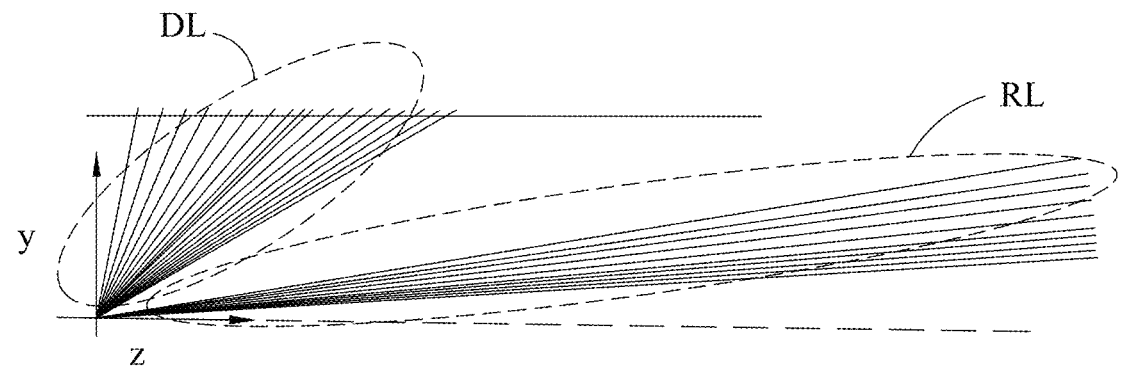
FIG. 5A~5B are schematic views showing the irradiation distance of the LED light source according to the first embodiment of the LED light source module of the disclosure.

FIG. 5A is a schematic view showing the irradiation distance of the LED light source according to the first embodiment of the LED-light source module of the disclosure. As shown in FIG. 5A, the range of irradiation can be adjusted by changing curvature and the disposed position of the optical reflecting surfaces (131); the maximum range of irradiation is 200 cm if the distance between the LED light source (141) and the predetermined irradiation surface is 60 cm; the maximum range of irradiation W is around 200 cm. When it comes to the direct light (DL) and the reflecting light (RL), if the angle of the reflecting light (RL) is excessively large, the light will start to irradiate toward the plane and the ground resulting in lowering the rate of utilization of the light source.

Figure 5B:
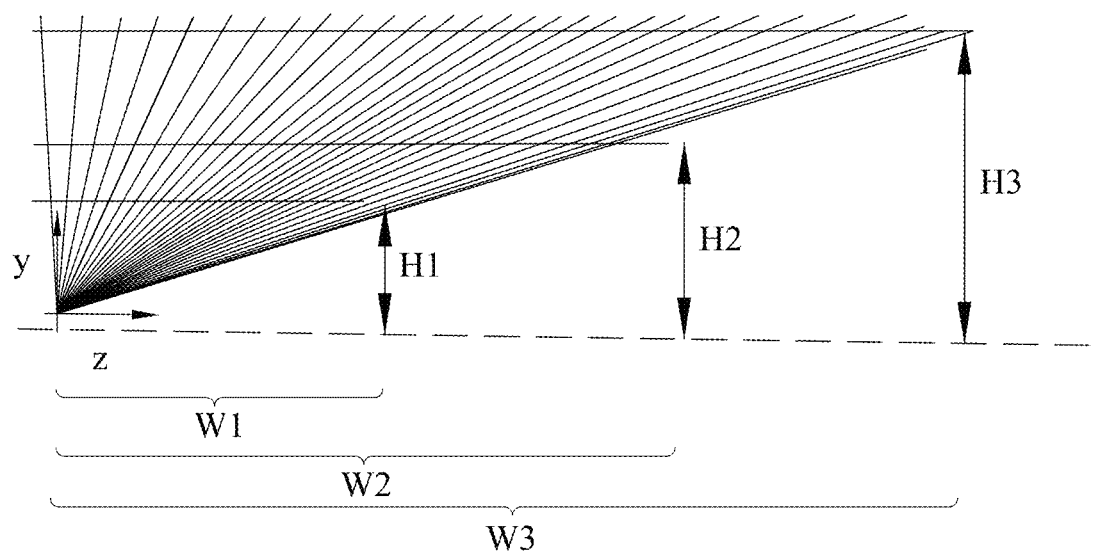

FIG. 5B is a schematic view showing the irradiation distance of the LED light source according to the first embodiment of the LED light source module of the disclosure. As shown in FIG. 5B, the distance between the LED light source (141) and the predetermined irradiation surface can be increased in order to have the irradiation range W increase. When the irradiation distances are H1 (40 cm), H2 (60 cm) and H3 (100 cm) respectively, the range of irradiations are W1 (120 cm), W2 (200 cm) and W3 (300 cm) respectively. However, since the illumination is inversely proportional to the square of the distance, the illumination of the predetermined illumination surface will decrease.

Therefore, in the present embodiment, the distance between the LED board (14) and the predetermined irradiation surface is set to be 60 cm to 100 cm, and the range of irradiation of the LED light sources (141) can achieve to be 200 cm to 300 cm.

Figure 6:
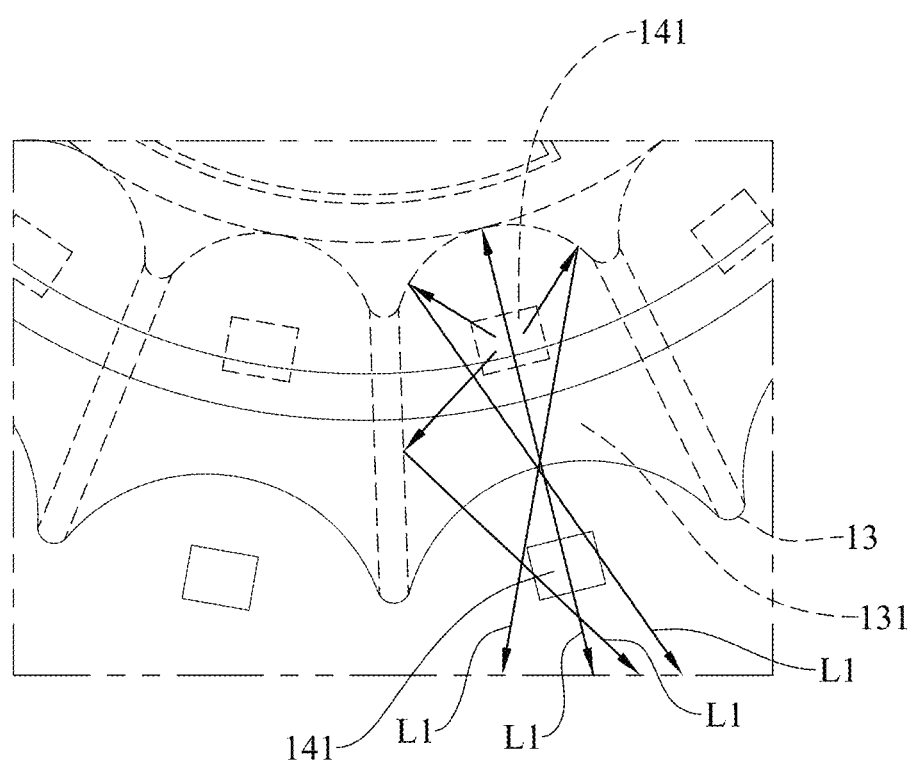
FIG. 6 is a schematic upside-down view of the optical reflector of the first embodiment of the LED light source module of the disclosure.

FIG. 6 is a bottom view of the optical reflector (13) of the first embodiment of the LED light source module of the disclosure. As shown in FIG. 6, the optical reflecting surfaces (131) can be a groove having a continuous curved surface, and the light ray L1 irradiated from the LED light source (141) furnished along the inner circle can be effectively aggregated through the optical reflecting surfaces (131) and then irradiate at a specific angle. Therefore, the optical reflecting surfaces (131) can provide a light-condensing effect to give the LED light source (141) a larger light beam angle in the horizontal direction.

Figure 7:
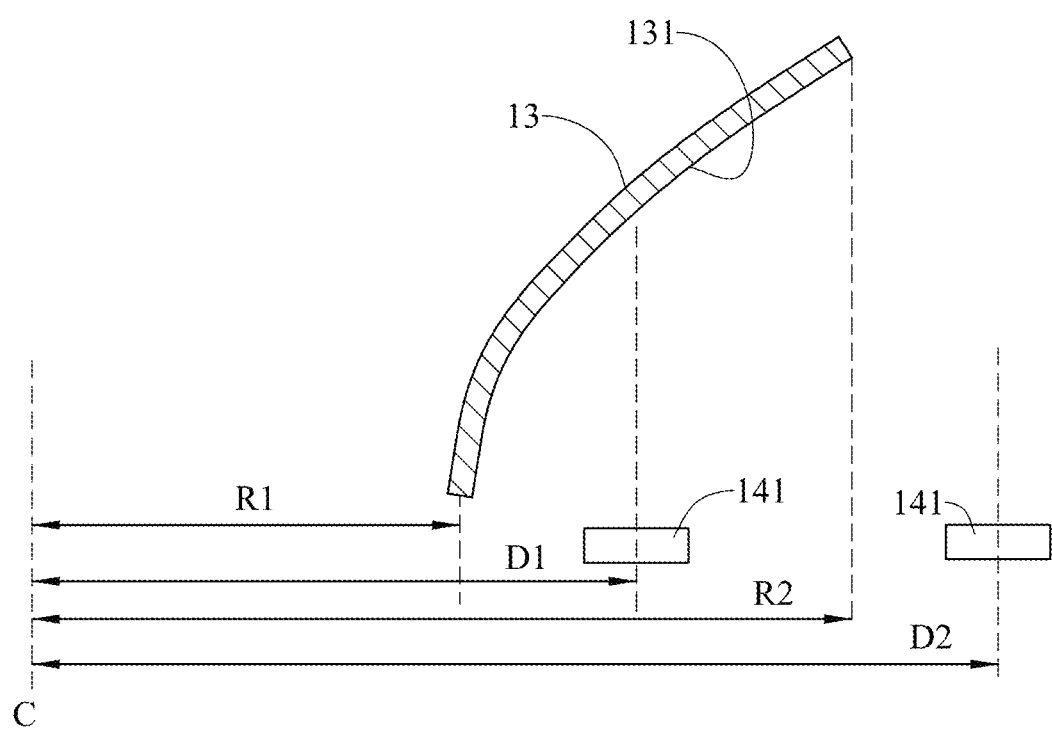
FIG. 7 is a schematic view of the positions of the LED light source according to the first embodiment of the LED light source module of the disclosure.

FIG. 7 is a schematic view of the positions of the LED light source according to the first embodiment of the LED light source module of the disclosure. As shown in FIG. 7, let the distance between the LED light source (141) furnished along the inner circle and the center C of the LED board (14) be D1; the distance between the LED light source (141) furnished along the outer circle and the center C of the LED board (14) be D2; the distance between the inner edge of the optical reflector (13) and the center C of the LED board (14) be R1; as well as the distance between the outer edge of the optical reflector (13) and the center of the LED board (14) be R2. In the present embodiment, R1<D1<R2, and R2<D2<1.5R2; through the above-described mechanism design, LED light source module (1) can have better efficiency.

It is known from the above illustration that the first embodiment of the LED light source module (1) of the present disclosure is applicable to an orchard using a scaffolding, and it is also applicable to other places where light beam irradiation is needed to increase the range of light beam irradiation.

It is worth mentioning that since the CFL of the prior art is low in luminous efficiency and high in power consumption, and while a large number of CFLs are employed in the orchard by the fruit farmer. As the LED light source module (1) of the present embodiment uses LED light source which is high in luminous efficiency and low in power consumption, if the LED light source (141) is employed by the orchard, the orchard needs only a small number of LED light sources to achieve the desired efficacy.

Moreover, the light irradiated by the CFL of the prior art is irradiated in all directions without directivity (sense property), about 50% of the light irradiated by the CFL will be irradiated towards the ground, causing the rattan creeping vines creeping around on the scaffolding unable to effectively utilize the light irradiated by the CFL. On the other hand, since the optical reflector (13), possessed by the LED light source module (1) of the disclosure, is capable of reflecting the light irradiated by the LED light source module (1) making it possess directivity (sense property), thereby, the plant can effectively utilize the light irradiated by the LED light source module (1).

What is more, since the spectrum of the CFL of the prior art is not completely the same as that of plant photosynthesis, the energy produced by CFL can not be sufficiently absorbed by the plant. Instead, according to an embodiment of the present disclosure, the LED light source of the LED light source module has a special light disposing ratio design which makes it more compatible with the spectrum of plant photosynthesis, thereby the energy generated by the LED light source module can be sufficiently absorbed by the plant.

In addition, since the CFL of the prior art does not possess the waterproof function, the vapor is apt to permeate into the CFL causing fault or damage, thereby it is not applicable for use in the open space, net house and the greenhouse. Instead, according to an embodiment of the present disclosure, the LED light source module has a special waterproof design, so that the vapor or rain were not apt to permeate into the LED light source module, thereby it can greatly reduce the faulty rate of the LED light source module and increase the service life of the LED light source module, thereby, it is applicable in the open space, net house and greenhouse.

Furthermore, according to an embodiment of the present disclosure, the LED light source module has an optical reflector that includes a plurality of optical reflection surfaces corresponding to the LED light source of the LED light source module, thereby the light beam angle of the LED light source module can be extended, and the efficacy and the light illumination uniformity in short distance of the LED light source module (1) can be enhanced.

Figure 8:
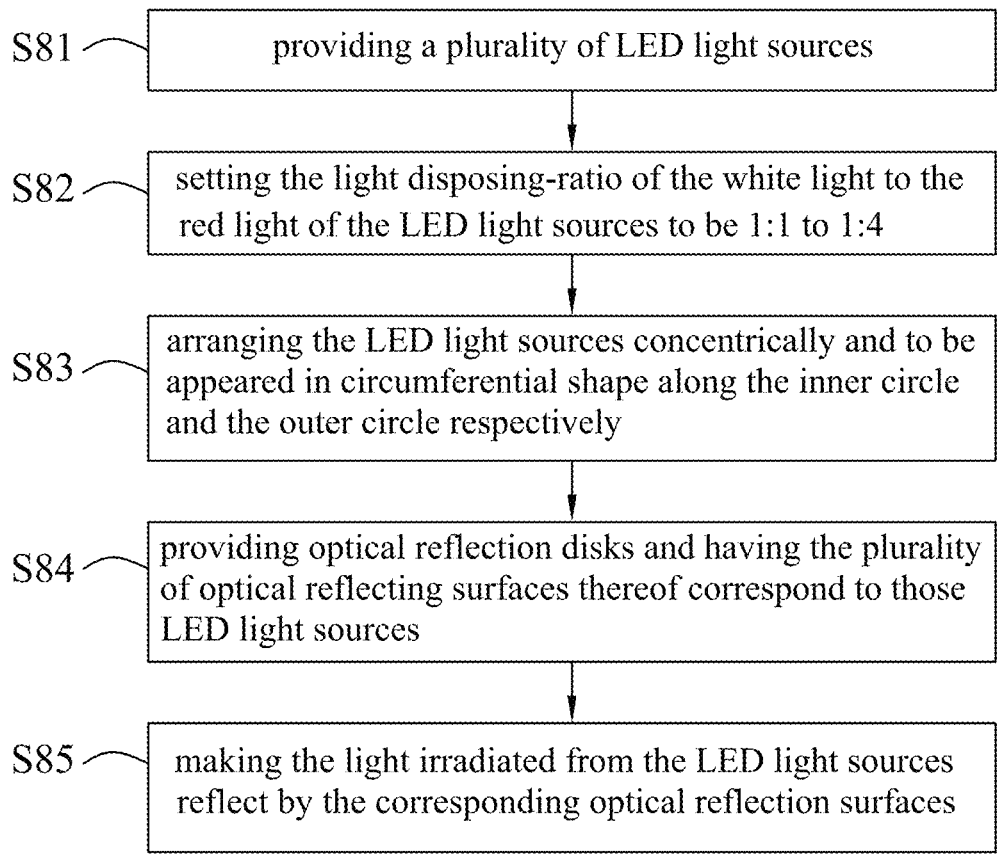
FIG. 8 is a flowchart of the first embodiment of the LED light source module of the disclosure.

FIG. 8 is a flowchart of the first embodiment of the LED-light source module of the disclosure. As shown in FIG. 8, the method for light irradiation of LED light source module includes the following steps—S81~S85

Step S81: providing a plurality of LED light sources;
Step S82: setting the light disposing ratio of the white light to the red light of the LED light sources to be 1:1 to 1:4;
Step S83: arranging the LED light sources concentrically and to be appeared in circumferential shape along the inner circle and the outer circle respectively;
Step S84: providing optical reflectors and having the plurality of optical reflecting surfaces thereof correspond to those LED light sources;
Step S85: making the light irradiated from the LED light sources reflect by the corresponding optical reflection surfaces.

Figure 9:
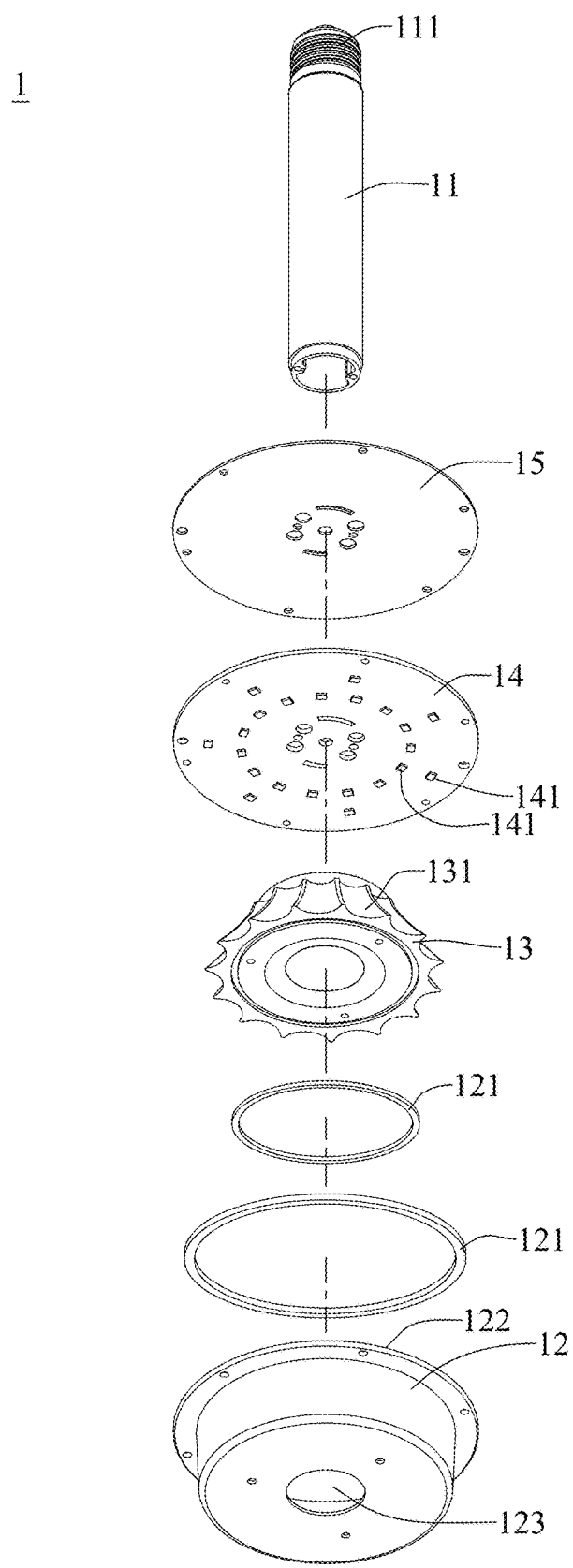
FIG. 9 is an exploded view of a second embodiment of the LED light source module of the disclosure.
Figure 10:
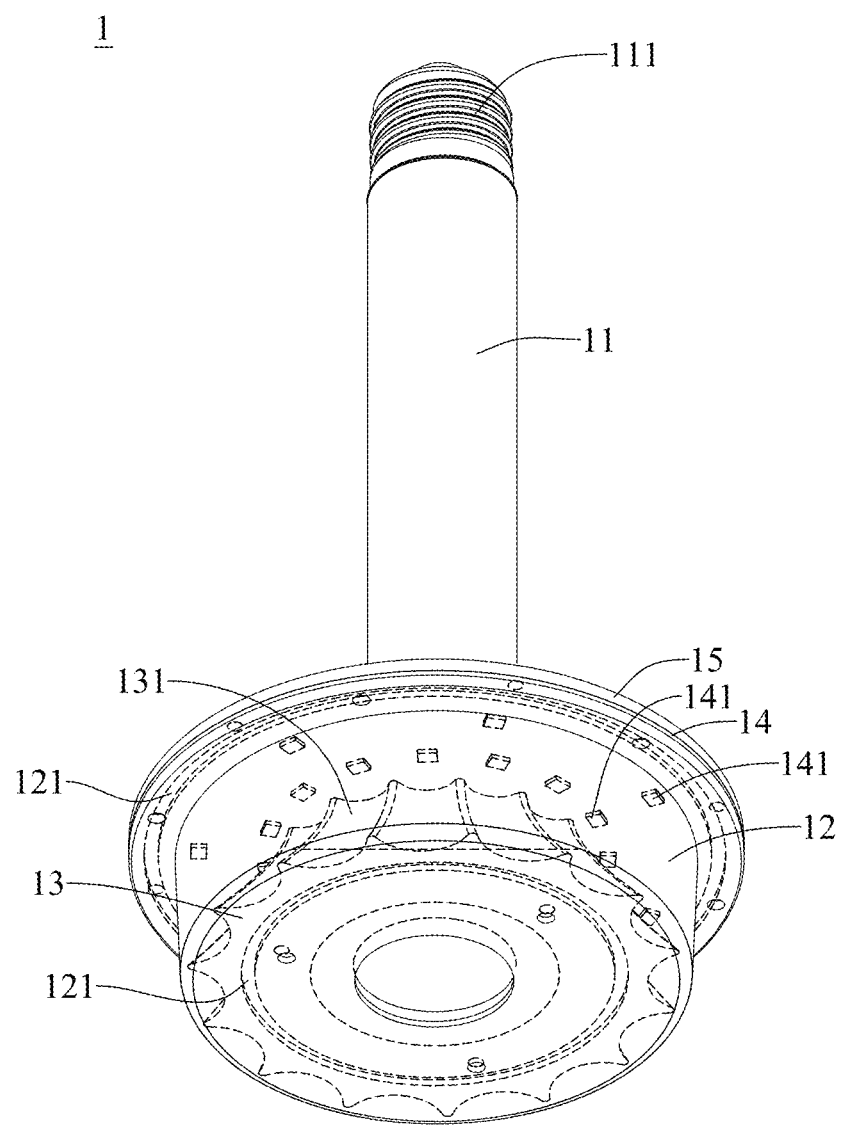
FIG. 10 is an outward appearance after the components are combined of the second embodiment of the LED light source module of the disclosure.

FIG. 9 and FIG. 10 is an exploded view and an outward appearance respectively of a second embodiment of the LED-light source module of the disclosure. As shown in FIG. 9 and FIG. 10, the LED light source module (1) includes a lamp pole (11), a waterproof cover (12), an optical reflector (13), a LED board (14) and a heat-dissipating base (15).

As shown in FIG. 9, the LED board (14) can be furnished with a plurality of LED light sources (141). In the present embodiment, LED light source (141) can be arranged concentrically along the inner and outer circles respectively.

The heat-dissipating base (15), which can provide the function of heat dissipation to prevent the LED board (14) from being damaged due to overheating, can be furnished above the LED board (14) and connected thereto.

The optical reflector (13), being furnished below the LED board (14), can have a plurality of optical reflecting surfaces (131) and each of which can be a groove with a curvy surface and can correspond to at least one LED light source (141). These LED light sources (141) are irradiated from the top to the bottom, and are reflected downward by the optical reflecting surfaces (131).

The waterproof cover (12), being in a bowl shape, includes an open end (122) and a through hole (123). The open end (122) of the waterproof cover (12) is connected to the LED board (14). The optical reflector (13) is furnished between the waterproof cover (12) and the LED board (14).

The lamp pole (11), being in hollow shape, can have a power supply furnished therein (not shown in the Figure), and one end of the lamp pole (11) can be connected to the LED board (14), while the other end of the lamp pole (11) can contain a lamp head (111) which can be connected to a power supply socket (not shown in the Figure) to drive the those LED light sources (141).

The waterproof cover (12) includes a plurality of waterproof rubber strips (121) to enhance the waterproof effect of the LED light source module (1). In the present embodiment, the waterproof rubber strips (121) can be furnished between the optical reflector (13) and the waterproof cover (12) respectively, as well as the connecting portion of the open end (122) of the waterproof cover (12) and the LED board (14), thereby enhancing the waterproofing effect of the LED light source module (1).

According to the present embodiment, the LED light source module (1), having a special structural design, is not only applicable to an orchard using a scaffolding but also applicable to orchard with plants growing on the ground. In addition, it is also applicable to other places where the light beam irradiation is needed to increase the range of light beam irradiation. Therefore, it is more flexible when it comes to use.

The detailed structure and their connecting relations of the LED light source module (1) are similar to the above-described embodiment, thereby it is not going to say more than what is necessary here.

To summarize the above-mentioned illustration, since the LED light source module (1), according to the embodiments of the disclosure, if the fruit farmer of the orchard employs LED light source (141) which is high in luminous efficiency and low in power consumption, the fruit farmer needs only a small number of LED light sources to achieve the desired efficacy.

Moreover, according to the embodiment of the disclosure, the optical reflector (13), possessed by the LED light source module (1) of the disclosure, can reflect the light irradiated by the LED light source module (1) making it possess directivity (sense property), thereby, the plant can effectively utilize the light irradiated by the LED light source module (1).

What is more, according to an embodiment of the present disclosure, the LED light source module has optical reflector (13) that include a plurality of optical reflection surfaces corresponding to the LED light source of the LED light source module, thereby the light beam angle of the LED light source module can be extended, and the efficacy and the light illumination uniformity in short distance of the LED light source module (1) can be enhanced.

In addition, according to an embodiment of the present disclosure, the LED light source of the LED light source module has a special light disposing ratio design which makes it more compatible with the spectrum of plant photosynthesis, thereby the energy generated by the LED light source module can be sufficiently absorbed by the plant.

What is more, according to an embodiment of the present disclosure, the LED light source module has a special waterproof design, so that the vapor is not apt to permeate into the LED light source module, thereby it can greatly reduce the faulty rate of the LED light source module and increase the service life of the LED light source module, thereby, it is applicable in open space net room and greenhouse.

Furthermore, according to an embodiment of the disclosure, the LED light source module (1), having special structural design, can change the irradiating direction in accordance with actual requirements, thereby is applicable to an orchard using scaffolding. It is also applicable to orchard with plants growing on the ground. In addition, it is also applicable to other places where the light beam irradiation is needed to increase the range of light beam irradiation. Therefore, it is more flexible when it comes to use.

For conclusion, on the technology that breaks through that of the prior art, the present disclosure does substantially achieve the desired efficacies.

It will become apparent to those people skilled in the art that various modifications and variations can be made to the structure of the disclosure without departing from the scope or spirit of the disclosure. In view of the foregoing description, it is intended that all the modifications and variation fall within the scope of the following appended claims and their equivalents.

What is claimed is:
1. A light emitting diode (LED) light source module, comprising:
a LED board, furnished with a plurality of LED light sources arranged concentrically along an inner circle and an outer circle respectively;

an optical reflector, being furnished above the LED board, has a plurality of optical reflecting surfaces that are corresponding to those LED light sources making them irradiate upward;

a waterproof cover, being in bowl-shape, has the open end thereof connect to the LED board; the optical reflector is furnished between the waterproof cover and the LED board; and a lamp pole, being in hollow-shape, has a power supply furnished therein; both ends of the lamp pole are connected to the LED board and the power supply socket respectively;

wherein a distance between the LED light source furnished along the inner circle and a center of the LED board is D1; a distance between the LED light source furnished along an outer circle and the center of the LED board is D2; a distance between an inner edge of the optical reflector and the center of the LED board is R1; and a distance between the outer edge of the optical reflector and the center of the LED board is R2 wherein R1<D1<R2, and R2<D2<1.5R2.

2. The LED light source module as claimed in claim 1, wherein each of the optical reflecting surfaces is a continuous curve surface.

3. The LED light source module as claimed in claim 2, wherein a curvature of the optical reflecting surfaces includes a first block B1 and a second block B2 wherein an angle between the first block B1 and a horizontal plane is $\theta_{m1}$ while an angle between the second block B2 and the horizontal plane is $\theta_{m2}$, and a range of $\theta_{m1}$ is $56°<\theta_{m1}<84°$ while a range of $\theta_{m2}$ is $53°<\theta_{m2}<56°$.

4. The LED light source module as claimed in claim 1, wherein each of the optical reflecting surfaces is concaved toward the center and is in groove shape.

5. The LED light source module as claimed in claim 1, wherein a light disposing ratio of a white light and a red light is from 1:1 to 1:4.

6. The LED light source module as claimed in claim 1, wherein an irradiation range of the LED light source is from 200 cm to 300 cm when a distance between the LED board and a predetermined irradiation surface is set to be from 60 cm to 100 cm.

7. The LED light source module as claimed in claim 1, wherein the LED light sources furnished along the inner circle are irradiated upward and are reflected upward through the optical reflecting surfaces.

8. The LED light source module as claimed in claim 1, wherein a ratio of the number LED light source furnished along the inner and outer circles respectively is 2:1 to 3:1.

* * * * *